UNITED STATES PATENT OFFICE.

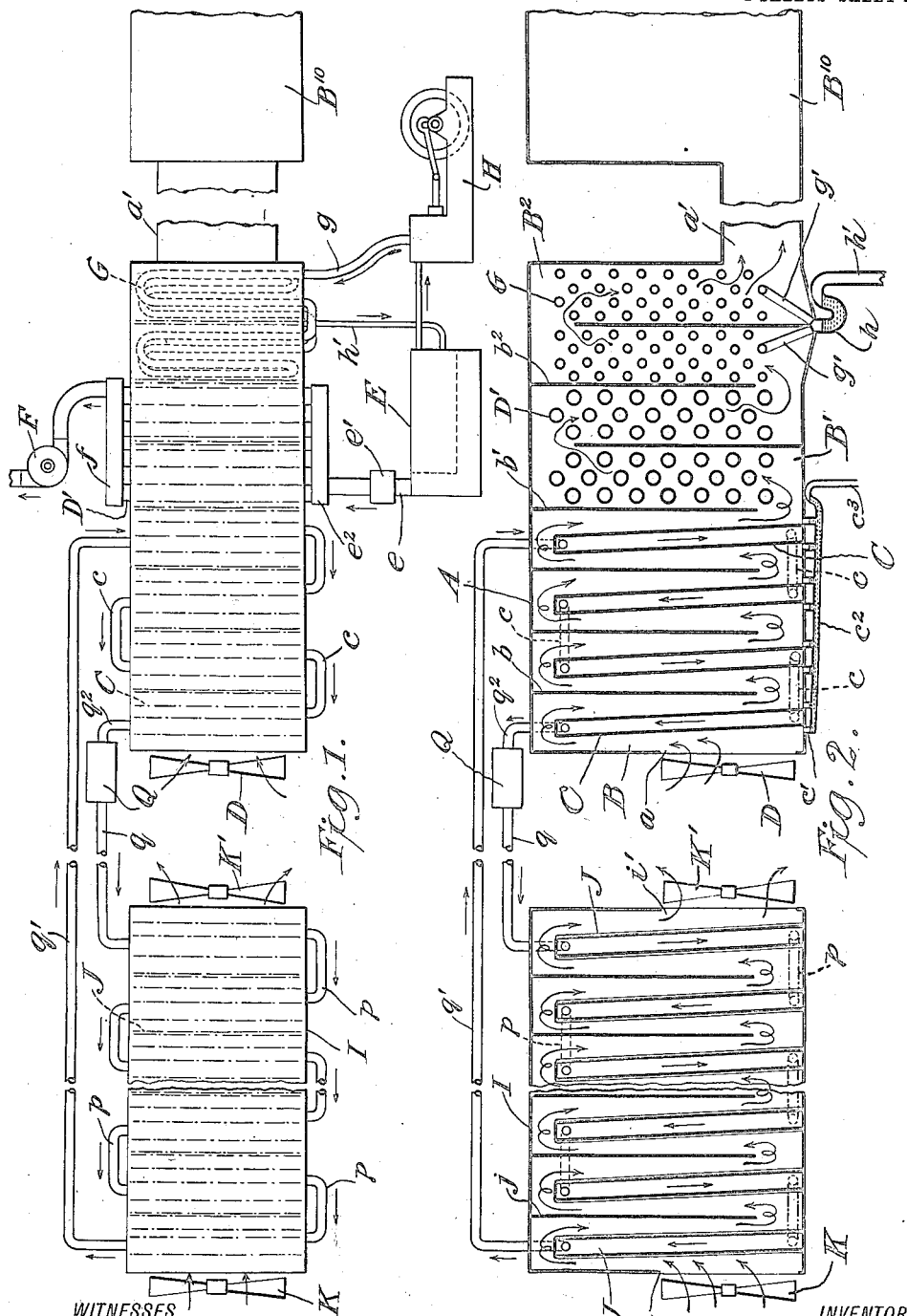

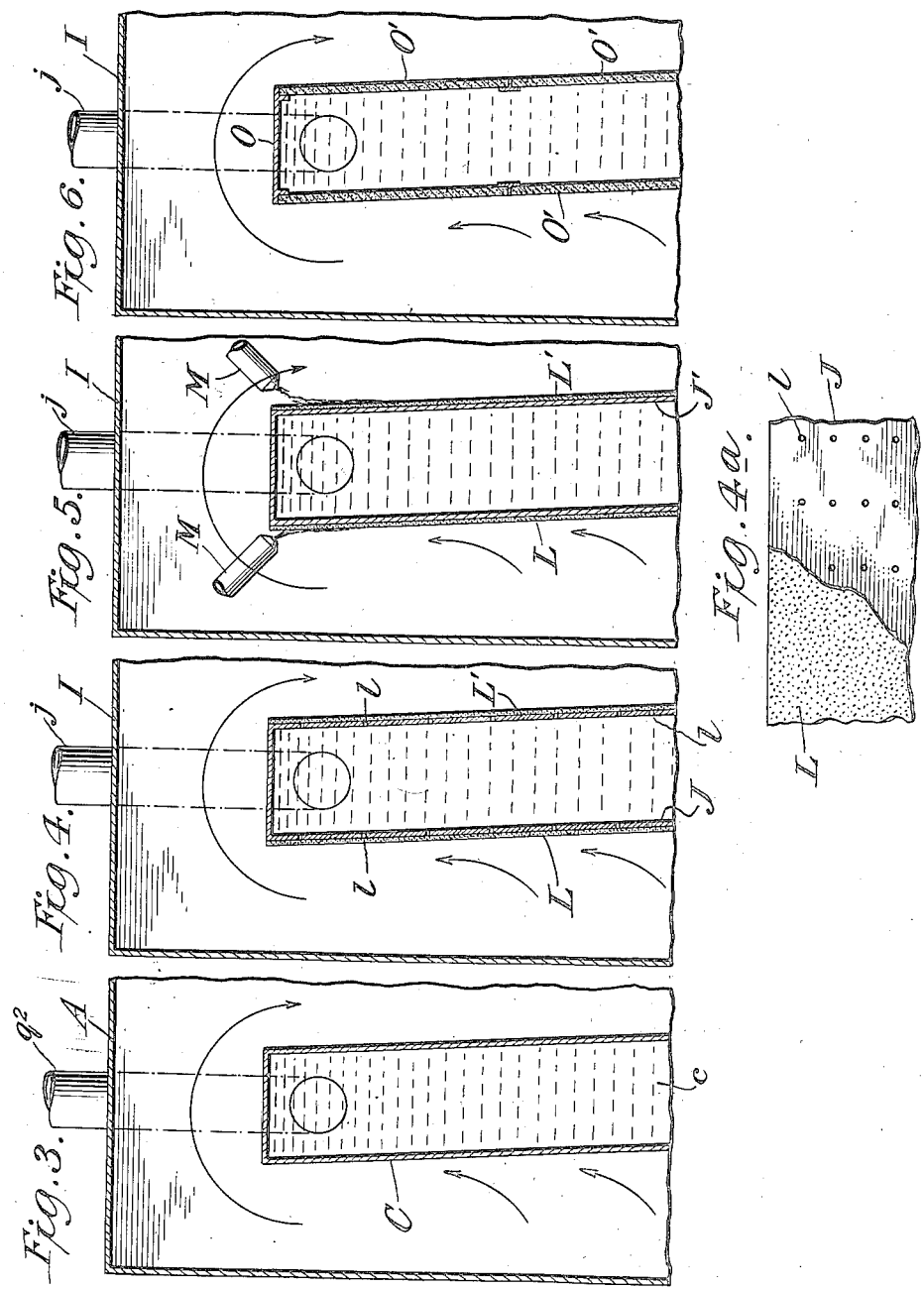

GORDON DON HARRIS, OF BAY SHORE, NEW YORK, AND JAMES S. POLLARD, OF BAYONNE, NEW JERSEY, ASSIGNORS TO GENERAL DEHYDRATOR COMPANY, OF NEW YORK, N. Y., A CORPORATION OF NEW YORK.

APPARATUS FOR DEHYDRATING AND WARMING AIR.

1,131,835.     Specification of Letters Patent.     Patented Mar. 16, 1915.

Application filed January 4, 1912. Serial No. 669,360.

*To all whom it may concern:*

Be it known that we, GORDON DON HARRIS, a citizen of the United States, residing at Bay Shore, Suffolk county, and State of New York, and JAMES S. POLLARD, a citizen of the United States, residing at Bayonne, Hudson county, and State of New Jersey, have invented a certain new and useful Apparatus for Dehydrating and Warming Air, of which the following is a specification.

This invention is an apparatus for expeditiously and economically dehydrating and warming air to be used particularly for dehydrating edible and other products, such as fruits, vegetables, and other substances which it is desired to dehydrate without changing their substantial characteristics except in the elimination of moisture therefrom.

The complete apparatus embodies a power plant, such as a steam boiler and engine, an air preheater adapted to utilize the products of combustion from the boiler, said combustion products being drawn thereto by an exhauster or fan which serves the function of a smoke stack in producing a draft through the boiler furnace, a second air heater adapted to be heated either directly from the boiler though preferably by the exhaust steam from the engine, suitable dehydrators for eliminating moisture from the air prior to introducing it into the aforesaid pre-heater and heater, and means for cooling the water which circulates through the air dehydrators.

The water cooling means embodies the principle of cooling by rapid evaporation induced by bringing a large volume of air into contact with extended moisture-containing surfaces exteriorly of the liquid to be cooled, thereby resulting in great economy of operation.

In the specific embodiment of the water cooling means, we employ a series of tanks for containing the water to be cooled, each tank being provided with means exteriorly thereof for keeping the surface of the tank moist, a blower and exhauster for subjecting these moist surfaces to a large volume of air whereby the water in said tanks, due to the rapid evaporation from their surfaces, is quickly cooled. The water to be cooled is circulated through the tanks by means of a pump and in a reverse direction to the path of the air which is used to effect the evaporation on the surfaces of said tanks.

The water cooling apparatus is so connected with the air dehydrators that the cold water coming from the former apparatus is introduced into and circulated through said dehydrators by means of a pump which may be the same pump which forces the water through the water cooler. The said cold water is introduced into the air dehydrators for the purpose of condensing the moisture from the air, it being brought into indirect contact therewith, thereby producing dry cold air. This dry cool air is then introduced into the preheater where its temperature is raised by the products of combustion from the boiler furnace, whence it passes through the heater where its temperature is further raised by the exhaust steam from the engine.

The apparatus described results in great economy of operation for the purposes designed, and it will be noted that the contributing factors to such economy are the utilization of the waste gases from the boiler furnace for heating purposes instead of allowing them to escape directly into the smoke stack, the direct use of the exhaust steam from the engine for heating the dehydrated air, the efficient method of cooling water based on rapid evaporation of vapor from the surface of the water cooler, and the utilization of the resulting cold water to dehydrate the air prior to heating the same. It will thus be observed that the system is complete within itself, and that the means adapted to conserve and utilize all the energy of the original fuel must necessarily result in great efficiency and economy of operation.

In the accompanying drawings, we have illustrated different practical embodiments of the invention, but the constructions defined therein are to be understood, only, and not as defining the limits of the invention.

Figure 1 is a diagrammatic view in plan illustrating the several elements composing the apparatus of the present invention for cooling water, cooling and dehydrating air, and subsequently heating the air to the required temperature in accordance with the present invention. Fig. 2 is a sectional diagrammatic view taken through the water cooling mechanism, the air cooling and dehydrating mechanism, and the air heating mechanism. Fig. 3 is a vertical section with parts broken away illustrating one of the chambered plates employed in the air dehydrating mechanism. Figs. 4, 4$^a$, 5 and 6 are views illustrating different embodiments of the means for cooling water by the rapid vaporization of moisture in contact with the surfaces of the chambered plates.

A designates a casing provided with an air inlet $a$, and an air outlet or flue $a'$, the latter being adapted for supplying dehydrated warm air to a suitable treating chamber B$^{10}$, which treating chamber may be of any suitable form or construction so as to utilize the dehydrated warm air in the treatment of any substance desired. The interior of the chamber within casing A is divided by partitions $b$, $b'$, $b^2$ so as to produce several compartments B, B', B$^2$. The compartments B contain a series of chambered members C, one of which is positioned opposite to air inlet $a$ so that the first plate of the series is directly in the path of air flowing through inlet $a$. Any desired number of chambered plates C may be used to effect the dehydration of air, but the number of plates will depend in a measure upon the condition of the air supplied to the casing A by the operation of a fan or blower D, the latter being positioned within or opposite to air inlet $a$ to the casing. As shown more particularly in Fig. 3, which represents one of the chambered plates employed in the air dehydrator, the plate C is composed, preferably, of metal plates so assembled as to produce a chamber $c$, within which is adapted to circulate cold water for the purpose of keeping the surfaces of member C at such a low temperature as to correspond to the "dew point," i. e., when air containing moisture flows into contact with the surfaces of member C, the moisture present in the air is deposited in the form of dew or water upon the surfaces which are kept in a cold condition by the water permitted to circulate through chamber C. Each plate C is positioned within a compartment B so as to stand at an angle to the walls of said compartment, and the first plate extends upwardly from the bottom of its compartment above the air inlet $a$, whereby the air is caused to flow in an upward direction at one side of, and in contact with, the plate, and in a downward direction upon the opposite side and in contact with the plate. By inclining each plate the inflowing air is more or less throttled as it passes toward and over the top of the plate, and is similarly throttled as it flows toward the bottom of the plate, this throttling of the air having a tendency to cause a whirling motion within the passage way so that different films or strata in the air current will be brought into intimate contact with each surface of the water cooled plate. This whirling or eddying of the air takes place in each of the series of compartments, and thus the air as it flows through the series of compartments will be forced into close contact with the successive chambered plates, whereby the air will be partly deprived of its moisture by contact with the first plate C, and it will be further deprived of its moisture by contact with the successive plates C of the series. As before stated, the number of plates will depend in a measure upon the humidity of the air blown through casing A, upon the volume of air required to be treated in order to supply the necessary quantity to the treating chamber B$^{10}$, and to the temperature of the water which is permitted to flow through the chambers of the series of plates, but to secure satisfactory results, the surfaces of the chambered plates C should be at such a low temperature as will result in condensing the moisture, down to the dew point, present in the air blown through the apparatus. The chambered plates composing the series are connected by suitably arranged pipes as at $c$ for the circulation of water through the plates in series, but, obviously, the arrangement of the pipes may be modified as desired. Furthermore, the water of condensation resulting from the deposit of moisture upon the surfaces of the plates is trapped from casing A by suitable pipes $c'$ connected with a common pipe $c^2$ communicating with a trap pipe $c^3$, see Fig. 2. Water is caused to circulate under pressure through the chambered plates by means presently described.

In one or more compartments B' positioned intermediate the partitions $b'$, $b^2$ are two or more stacks or coils of heating pipes D'. These pipes are of suitable diameter to provide for the free circulation therethrough of the waste gases and products of combustion from a furnace E. As shown diagrammatically in Fig. 1, furnace E is not provided with a stack or uptake for the products of combustion, but the smoke outlet $e$ is provided with a suitable "smoke destroyer" $e'$ of any suitable form known to the art for the purpose of removing the sediment and carbon from the products of combustion. The furnace outlet $e$ is shown in Fig. 1 as being connected with a suitable header $e^2$, with which communicates the air heating coils D' so that the waste gases from the furnace will circulate in series through the coils. In the absence of the stack or uptake from the furnace, means are provided for inducing the circulation of the waste gases from said furnace, said means being in the form of an exhauster F having communication with heating coils D' through a header f, see Fig. 1. The operation of exhauster F results in a flow of the waste heat and gases from furnace E through air heating coils D', as well as the inflow of air through the grate chamber necessary to support combustion within the furnace, the spent gases being discharged from exhauster F at any desired point. It will be understood that one or more stacks of heating coils D' may be employed in order to reduce the temperature of the waste heat and gases flowing through the coils and to impart the heat to the air circulating over, around, and between the coils, whereby the coils D' act to preliminarily heat the air by utilizing the spent gases from the boiler furnace.

In the compartment $B^2$ of casing A are two or more series of air heating coils G adapted to utilize the exhaust steam from an engine H, whereby the air flowing through, over, and around coils G will be raised to the temperature desired for treating the material in chamber $B^{10}$. The steam heated coils are connected with the engine by an exhaust pipe g, and the water of condensation resulting within said coils is discharged by suitable pipes g' into a trap h, from whence the water of condensation is returned by a pipe h' back to the boiler. Obviously, any desired number of coils, and any desired arrangement or construction of coils, may be employed in the final air heating coils to utilize the exhaust steam.

The water cooling apparatus employed for dehydrating and warming air to be supplied to a treating chamber of any suitable character, embodies in its construction a suitable form of casing I adapted to contain a series of chambered plates J, the number of said plates being suitable for the purpose of cooling the water to a desired temperature by the rapid vaporization of water from the surfaces of the plates. Casing I is of any suitable form and dimensions, the same being provided at one end with an air inlet i and at its other end with an air outlet i'. Suitable means are provided for securing a circulation of air in the required volume through casing I; as shown, a blower K and an exhauster K' are positioned at or within the air inlet i and air outlet i', respectively. The blower K operates, mainly, to force the required volume of air into and through the casing so that the air will have contact with the moist surfaces of the chambered plates J therein, whereas exhauster K' operates, mainly, to carry off the heavy moisture-laden air contained in the casing and resulting from the absorption of the moisture from the surfaces of the chambered plates J by the air blown into the casing by fan K.

Casing I is divided interiorly by series of partitions j so arranged with relation to chambered plates J as to result in the formation of a zigzag passage through which the air is caused to flow as it travels through the casing, whereby the air flowing through the casing is brought into intimate contact with the surfaces of plates J.

Various forms of construction of the chambered plates J are shown in Figs. 4, $4^a$, 5 and 6 of the drawings, either of which forms of construction, or any mechanical equivalent thereof, may be employed in the apparatus for cooling water in accordance with the present invention.

As shown in Figs. 4 and $4^a$, each chambered plate J is in the form of a metal tank, the walls of which are composed of copper or other metal having high conductivity properties for heat and cold. To effect the cooling of water adapted to circulate through the chambered plate, the outer surfaces of said plate are provided with layers L, L' of an absorbent material, which layers are kept in a moistened condition by small quantities of water supplied through perforations l provided in the walls of the plate, so that the air circulating through the casing I will be brought into contact with the moist surfaces afforded by the saturated layers L, L', the effect of which is to carry off the moisture from the surfaces of the plates and to cool the water by rapid evaporation.

The layers of absorbent material L, L' may be composed of felt, fabric, paper, or any other suitable material which will rapidly absorb and give off the moisture. The perforations l in the walls of the tank are rather small so as to minimize the loss of water required to keep the absorbent material in a moistened condition, and at the same time provide for the outflow of a sufficient quantity of the water necessary to maintain the layers of absorbent material in said moistened condition, the aim being to preclude the air circulating through the casing from drying out the layers of absorbent material upon the surfaces of the plates.

Instead of supplying water from plates J through perforations l to moisten the layers of absorbent material, a tank with imperforate walls may be employed as indicated at J' in Fig. 5. The tank J' is provided with layers of absorbent material L, L' on the outer surfaces thereof exposed for contact with air, and the water required to keep these layers L, L' is supplied by a pipe or pipes M, from which pipe or pipes the water is permitted to trickle in such quantities as will result in keeping the layers L, L' in a wet condition.

Instead of employing the metallic tank with exterior layers of absorbent material, a tank constructed as shown in Fig. 6 may be used. As there shown, the tank is composed of a skeleton metal frame O and slabs of porous earthenware O'. The slabs are composed of clay or other suitable material prepared in a desired way, and they are set and held in openings of frame O so as to constitute the walls of the chambered water tank. The earthenware walls permit the percolation of sufficient water from the chamber of the tank to keep the outer surfaces of said tank in a moist condition, and as these outer surfaces are exposed to the air flowing through casing I, it follows that the heat present in the water will be carried off by the evaporation process, as a result of which the water will be lowered to the required temperature.

As hereinbefore stated, any desired number of chambered plates or tanks may be positioned within casing I of the water cooling apparatus. These chambered plates are connected by pipes $p$ for the circulation of water through them in series.

Means are provided for effecting the circulation of water in a positive manner, the water circulating through the chambered plates contained within casing I in an opposite or reverse direction to the flow of air through said casing; as shown in Figs. 1 and 2, air circulates from left to right through casing I by the action of blower K and exhauster K', but water circulates from right to left through the chambered plates within casing I. The water circulating means is shown as consisting of a pump Q, the same being adapted to effect the circulation of water through chambered plates C of the air dehydrator as well as through the chambered plates J of the water cooling apparatus. As shown, pump Q has its outlet connected by a pipe $q$ with one of the chambered plates J so that water will be forced through the series of plates from one end of the water cooler casing to the opposite end thereof, whence the water flows through a pipe $q'$ to one of the chambered plates C of the air dehydrator, the final plate of said air dehydrator having connection by a pipe $q^2$ with the intake side of the pump.

The pipes may be arranged as deemed expedient by the skilled engineer, and if desired, cold water may be supplied to the chambered plates of the air dehydrator by a system of headers and valves adapted to control the flow of water through the individual chambered plates C, although it has not been considered necessary to illustrate this particular adaptation of the means for controlling the flow of water through said plates C.

The water cooler apparatus may occupy any desired relation to the air dehydrating and warming elements of the system. Obviously, the water cooling apparatus may be positioned at one side of casing A. either above or below it. Should the conditions be such as to warrant the arrangement, the water cooler apparatus may be located in the cellar or basement of the building and be connected with the air dehydrating and warming devices by suitable pipes, the necessary circulation of water between chambered plates J and C being effected by the operation of a pump. Under certain circumstances, however, it is preferred to position the water cooling apparatus in line, and in front of, the air dehydrating apparatus, a sufficient space being left between casings A, I, to provide for the outflow of moisture-laden air from casing I without interfering with the intake of atmospheric air by casing A.

It should be stated that the chambered plates J are positioned within the compartments of casing I in the same order as chambered plates C are positioned within casing A. It follows that plates J are inclined relative to the walls and partitions of casing I so that the air will flow upwardly along one side of each plate and downwardly along the opposite side of the same plate, the air being throttled by the taper in the passages so as to secure the eddying or whirling effect of the air adapted to flow into contact with the moist surfaces of plates J.

When the apparatus is in use, water is supplied to chambered plates C, J, so as to be circulated therethrough by the operation of pump Q, the coils of preheater D' are in communication with the outlet from the boiler furnace in order that the waste heat and gases may be drawn through said preheater by the action of exhauster F, and the exhaust steam from the engine is supplied to the coils of the final heater G. Air is blown through inlet $a$ of casing A by blower D so that the air will circulate in a tortuous path through said casing A and in intimate contact with chambered plates C, preheater D' and heater G. The air flowing through inlet $a$ is brought at once into contact with the cold surfaces of the first plate C, the effect of which is to condense a certain proportion of the humidity or moisture contained in the air by contact with said cold surfaces of the first plate. The air flows into contact with the second plate of the series by which a further percentage of the humidity or moisture is removed therefrom, and this action takes place successively by the contact of the air with the series of plates which may be in service. The air is thus deprived of its moisture and it flows into contact with preheater D' so as to utilize the heat of the waste gases for preliminarily heating the air, and the final heating of the air is effected by its circulation into contact with the steam heated coils G, whereby the dehydrated and warmed air is adapted to flow through outlet $a'$ into the treating chamber $B^{10}$. It is to be noted that the air blown into contact with chambered plates C will be cooled and the moisture condensed therein so that the water present in said plates will absorb to a certain extent the heat from the air. The water is forced from the plates C into plates J by the operation of pump Q. Accordingly, the water is pumped through said plates J in an opposite direction to the circulation of air though casing I. As previously stated, the surfaces of plates J are kept in a moistened condition by any of the devices heretofore described, or their mechanical equivalents, and by circulating air through said casing I, by the operation of blower K and exhauster K', the moisture will be rapidly evaporated, the effect of which is to cool the water in said plates J, the cold water being returned by the pump to one of the plates C.

The operations of cooling and dehydrating the air, heating the air by the waste heat and exhaust steam from the power plant, and cooling the water are carried on continuously and automatically so that the necessary volume of warm dehydrated air will be produced with efficiency and economy. The air is treated so as to eliminate moisture or humidity therefrom, and is heated to the temperature required for use in desiccating chamber $B^{10}$.

Having thus fully described the invention, what we claim as new, and desire to secure by Letters Patent is:—

1. In an apparatus of the class described, a water cooler embodying a casing, a series of communicating tanks positioned therein, each of said tanks being provided with means for keeping the surfaces thereof in a moistened condition, means for blowing air through said casing and bringing said air into contact with the moistened surfaces of said tanks, and means for circulating water through said tanks.

2. In an apparatus of the class described, a water cooler embodying a casing, a series of communicating tanks positioned therein, each of said tanks being provided with means for keeping the surfaces thereof in a moistened condition, means for exhausting moisture-laden air from said casing, and means for circulating water through said tanks.

3. In a system of the class described, a water cooler embodying a casing, a series of communicating tanks positioned therein, each of said tanks being provided with means for keeping the surfaces thereof in a moistened condition, means for blowing air through said casing and bringing said air into contact with the moistened surfaces of said tanks, means for exhausting moisture-laden air from the casing, and means for circulating water through said tanks.

4. In a system of the class described, a water cooler embodying a chambered casing, a series of communicating tanks positioned within said casing, each of said tanks having means for keeping the surfaces thereof in a moistened condition, means for circulating air through said casing, means for directing the air in a tortuous path and into intimate contact with the moistened surfaces of the tanks, and means for circulating water through said tanks.

5. In a system of the class described, a water cooler embodying a chambered casing, a series of chambered tanks positioned within said casing, each of said tanks having means for keeping the surfaces thereof in a moistened condition, means for circulating air in one direction through the casing and into contact with the moistened surfaces of the tanks, and means for circulating water through said tanks in an opposite direction to that in which air circulates through the casing.

6. In a system of the class described, a water cooler embodying a chambered casing, a series of chambered tanks positioned within said casing, each of said tanks having means for keeping the surfaces thereof in a moistened condition, a blower and an exhauster for circulating air in one direction through said casing and into contact with the moistened surfaces of said tanks, and a pump for effecting the circulation of water through said chambered tanks and in an opposite direction to that in which the air circulates through the casing.

7. In a system of the class described, a water cooler embodying a casing provided with interior baffles, a series of water tanks each having means for keeping the surfaces thereof in a moistened condition, said tanks coöperating with the baffles so as to produce a tortuous air passage within the casing, means for circulating air within the air passage and into contact with the moistened surfaces of the tanks, and means for circulating water through the tanks in a direction opposite to that in which air circulates around the tanks.

In testimony whereof we have signed our names to this specification in the presence of two subscribing witnesses.

GORDON DON HARRIS.
JAMES S. POLLARD.

Witnesses:
H. I. BERNHARD,
J. F. MOTHERSHEAD.